UNITED STATES PATENT OFFICE.

CHARLES L. COFFIN, OF DETROIT, MICHIGAN, ASSIGNOR OF ONE-HALF TO GEORGE H. LOTHROP, OF SAME PLACE.

PROCESS OF TREATING ORE CONTAINING LEAD, SILVER, AND ZINC.

SPECIFICATION forming part of Letters Patent No. 442,016, dated December 2, 1890.

Application filed February 5, 1890. Serial No. 339,228. (No specimens.)

*To all whom it may concern:*

Be it known that I, CHARLES L. COFFIN, of Detroit, in the county of Wayne and State of Michigan, have invented a new and useful Improvement in Processes of Treating Ore Containing Lead, Silver, and Zinc, of which the following is a specification.

My invention consists in a process for treating ore, hereinafter fully described and claimed.

There are numerous ores which contain silver and lead in paying quantities, (sometimes gold and copper also in small quantities,) but which carry such a high percentage of zinc that the smelter's charge is too great to permit them to be profitably worked; and the object of my invention is to remove the zinc from such ores, so as to reduce the percentage of zinc within that usually allowed by smelters. I am aware that such ores have been treated prior to this application (though, I believe, subsequent to my invention) by chloridizing or by chlorination, followed by leaching with hot or cold water or brine, and precipitating the zinc from the leach fluid; but such attempts have (so far as I know) proved unprofitable and have been abandoned. The defect of these attempts lies in the fact not generally known that, while zinc chloride is soluble and lead chloride is to a certain extent soluble in hot water, silver chloride, which is usually considered insoluble, is to a considerable extent soluble in brine or in a solution of lead chloride or zinc chloride, or both, and lead chloride is more soluble in a solution of zinc chloride than in water or brine. The result is that the salt solutions dissolve out a considerable portion of the silver and lead chlorides, and thus impoverish the ore. Another defect is that the chlorides of metals other than those above named are dissolved out of the ore and are all mixed with the zinc when precipitated, thus rendering the zinc of no commercial value without further and expensive treatment.

The further object of my invention is to save the silver, lead, and any precious metals which may be in the ore and to obtain the zinc in merchantable condition.

As the constituents of different ores vary widely, it is impossible to make any single statement thereof which will apply accurately to all of them, and in treating ore by my process it should be carefully examined to determine what metals it carries. Take, for example, the low-grade silver, lead, and zinc ores of Colorado, commonly called "sulphide ore." I find that these ores contain, usually, the following metals: lead, zinc, silver, cadmium, antimony, arsenic, occasional small amounts of copper, and traces of gold. Thallium is often present, accompanied by indium, and at intervals an ore is found carrying tellurium and gallium. It is the mixture of some or all of these metals with the oxide of zinc when precipitated which has rendered the zinc commercially worthless.

My process is as follows: I first roast the ore in the usual manner of chloridation, roasting till the sulphides are converted into chlorides and sulphates or sulphites, or subject the ore to a simple oxidation roasting until the sulphides are converted into sulphites and sulphates or oxides; but I prefer chloridation roasting. In lieu of or in addition to roasting the ore may be treated by free or so-called "nascent chlorine," generated by electrolysis or in any other known way, being for this process an equivalent for roasting, though more expensive and not so good. This treatment having converted the zinc and some other metals in the ore into chloride, sulphites, or sulphates, I place the ore in a leaching-vat and leach the mass with water or brine, either hot or cold, using as small a quantity of fluid as will dissolve out the amount of zinc which I desire to remove, and this leaches out of the ore the salts therein contained, which are soluble either in the leaching-fluid alone or in the resulting solution of salts, leaving the ore in condition for smelting. From this leaching-vat I pass the leach-fluid into and through a vat or tub containing fine charcoal. This arrests any gold which may have been dissolved out of the ore, the same being deposited on the charcoal, and also filters or strains out all sediment from the fluid, leaving it clear and free from impurities. This step may be omitted, even if gold is present in small quantities, as that will be arrested farther on; but whether gold be present or not I prefer to thus filter the leach-fluid through carbon to remove the sediment which the fluid holds in mechanical suspension. After passing through the charcoal I pass the fluid into and through a vat or tub containing metallic lead, preferably in granular form, to present a large extent of surface. If the fluid contains any gold after passing through the carbon in the former vat, it will be precipitated on the lead in this vat. If any copper is present in the fluid, it will be precipitated on the lead. The silver which is contained in the fluid is precipitated upon the lead in metallic form, thus making a lead and silver sludge or mass ready for cupelling. From this vat the fluid, enriched in lead solution in proportion to the amount of precipitation which occurred in the lead-vat, is passed into and through a vat or tub containing metallic zinc, preferably in granulated form. In this vat the lead contained in the fluid is precipitated in metallic form, and other metals (except zinc) which may be present—such as cadmium, thallium, indium, &c.—are also precipitated, and the fluid is here enriched in zinc in proportion to the reaction which has taken place. From this vat I pass the fluid, which now consists, essentially, of zinc solution in a very pure state, into a receiving vat or tub, where the zinc may be recovered in any known way. The fluid may contain other substances than zinc—such as soda, potash, magnesium, lithium, alumina, calcium, &c.—as ores of the grade for which my process is intended often contain some or all of these substances; but these do not injure the oxide of zinc, even if some of them should be mixed with it, so that as the object of my process is to fit these ores for smelting without wasting silver and lead, and finally to obtain the zinc in a marketable condition for the purposes of my process, the fluid is at this stage essentially a pure zinc solution. If an oxide or carbonate of zinc is desired, it may be precipitated by lime-water, sodic carbonate, or other cheap precipitant. The resulting liquid may be allowed to run to waste, or, if sodic carbonate has been used as a precipitant, the salt may be recovered by evaporation and used for roasting or for producing chlorine gas. If metallic zinc is desired, the zinc solution is subjected to electrolysis. The resulting chlorine may be used in treating the ore. If zinc chloride is desired, it may be obtained in a crude state by evaporating the fluid.

The construction and use of leaching vats or tubs are so well known that I have not deemed it necessary to illustrate them in connection with this application. The vats or tubs may be of any desired shape, and their size will vary in proportion to the amount of ore treated and the quantity of leach-fluid used. By placing the vats at different heights the leach-fluid will flow from one to the other without care or labor on the part of the operator. Whenever the ore being treated contains copper in sufficient quantity to be objectionable in the mass or sludge of lead and precipitated silver, I precipitate the silver by passing the fluid from the charcoal vat or tub into and through a vat or tub containing metallic copper, preferably in granular form, which precipitates the silver in metallic form, and the fluid, enriched in copper, then passes on, as before set forth.

I have set forth the agents which I prefer to use, and believe that these will give the most satisfactory results in practical working; but any known equivalent for any of said agents for the purpose of precipitating salts of metals other than zinc may be substituted therefor without departing from my invention. The same fluid may be used to leach successive lots of ore until it becomes saturated, or nearly so, with metallic salts before being passed through the vats. At convenient intervals the contents of the vats may be removed and treated in any known way to recover the metals therein contained, and the vats recharged with fresh materials.

What I claim as my invention, and desire to secure by Letters Patent, is—

1. The herein-described process of treating ore containing lead, silver, and zinc to remove the zinc preparatory to smelting, consisting in first roasting the ore, then leaching the ore, filtering the leach-fluid through carbon, then subjecting the leach-fluid successively to the action of metallic lead and of metallic zinc, and finally precipitating the zinc held in solution in the leaching-fluid.

2. The herein-described process of treating ore containing lead, silver, and zinc to remove the zinc preparatory to smelting, consisting in roasting the ore, leaching the ore, and covering the silver dissolved out of the ore by the use of metallic lead.

3. The herein-described process of treating ore containing lead, silver, and zinc to remove the zinc preparatory to smelting, consisting in roasting and leaching the ore and then subjecting the leach-fluid to the action of metallic zinc.

4. The herein-described process of treating ore containing lead, silver, and zinc to remove the zinc preparatory to smelting, consisting in roasting and leaching the ore and then subjecting the leach-fluid successively to the action of metallic lead and metallic zinc.

5. The herein-described process of treating ore containing lead, silver, and zinc to remove the zinc preparatory to smelting, consisting in roasting and leaching the ore, then subjecting the leach-fluid successively to the action of metallic lead and of metallic zinc, and finally recovering the zinc from the leach-fluid.

6. The herein-described process of treating ore containing silver, lead, and zinc to remove the zinc preparatory to smelting, consisting in roasting and leaching the ore and precipitating the silver held in the leach-fluid by metallic copper.

CHARLES L. COFFIN.

Witnesses:
CHARLES B. LOTHROP,
GERTRUDE H. ANDERSON.